(No Model.)
H. R. WYKERT.
TIRE.
No. 596,930. Patented Jan. 4, 1898.
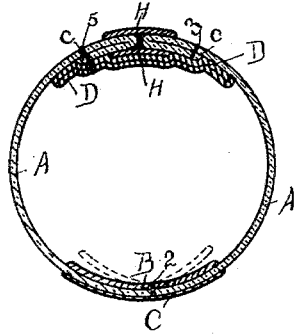
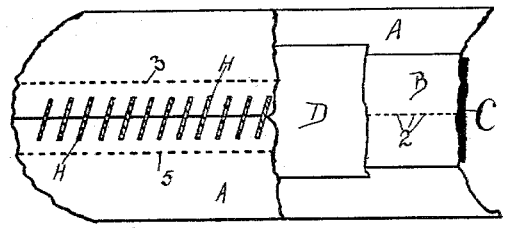
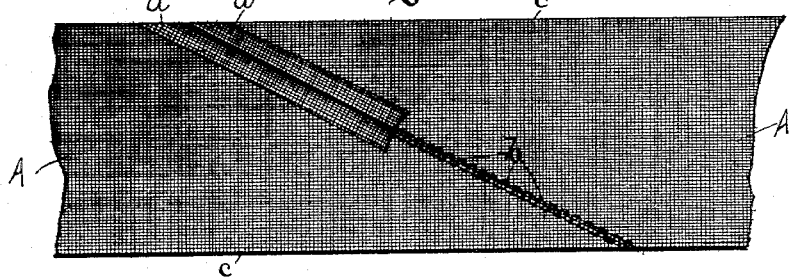
WITNESSES:
Henry R. Wykert
INVENTOR
BY
ATTORNEY.

UNITED STATES PATENT OFFICE.

HENRY R. WYKERT, OF OMAHA, NEBRASKA.

TIRE.

SPECIFICATION forming part of Letters Patent No. 596,930, dated January 4, 1898.

Application filed September 8, 1896. Serial No. 605,149. (No model.)

*To all whom it may concern:*

Be it known that I, HENRY R. WYKERT, residing at Omaha, in the county of Douglas and State of Nebraska, have invented certain useful Improvements in Tires; and I do hereby declare that the following is a full, clear, and exact description of the invention, such as will enable others skilled in the art to which it appertains to make and use the same, reference being had to the accompanying drawings, which form a part of this specification.

This invention relates to a novel improvement in outer tubes for pneumatic tires, the object of my invention being more particularly to provide a racing-tire that shall be noticeable because of its extreme lightness, durability, and resilience and by virtue of its peculiar construction shall be adapted to prevent lateral or side sliding.

In the accompanying drawings, Figure 1 shows a sectional view of a tire embodying my invention. Fig. 2 shows a top view disclosing the location and disposition of the various parts, while Fig. 3 shows a top view of the fabric before it is formed into the shape of a tube.

My invention comprises, essentially, an endless strip of material, which is preferably an exceedingly close-woven fabric which has its warp running in line with a plane passing centrally through the tire when completed, my object being to provide a tire in which the tread runs in line with and true to the warp of the fabric.

The aim of my invention is to provide a strip of woven material A of a suitable length and then cut the ends on a bias, so as to provide a bias seam, as is shown in Fig. 3. The ends $a$ are then recurved and lapped over and stitched together by means of the thread $b$, as is shown in Fig. 3. This gives me an endless belt which in cross-section would be in the form of a cylinder. This belt is of a suitable width and is next placed in some forming-rolls, so as to impart a cylindrical shape to this circular belt, the uniting ends as the belt is formed being lapped over, so that the edges $c\ c$ are recurved and are made to lie within the under side of the formed tube, as is shown in Fig. 1.

In forming these tires the fabric is of course worked so as to form a perfect endless tube provided with a central opening or slit extending the full inner diameter of the tube. The next step is to provide this tire with an inner strip B, which is secured by means of the stitching 2, so that this inner strip B, which may be of any suitable fabric or nonpuncturable material, is held only in the center, so it can nicely accommodate itself to the cylindrical form of the tire. The outer portion of the tire A can further be provided with a tread C, which may be of rubber and vulcanized to the tube or any other suitable material. One of the edges $c$ of the tube is next secured by means of the stitching 3, while the remaining edge is provided with a U-shaped or double strip D, which is so positioned that this double fabric, which is preferably of some thin material, such as linen or silk, forms a double thickness immediately below the united recurved edges of the tire, a strip 5 being used to unite both the recurved tire edge and the U-shaped reinforcing-strip D upon that side. The tire would then be provided with a suitable inner tube and then be closed by means of the lacing-thread H, which would within the tube lie below the recurved edges and the double reinforcing-strip D. By this means I provide an exceedingly light but at the same time durable tire which has the advantage in addition that the outer tube A can be unlaced at any point in repairing the damage to the tube.

The double reinforcement D further prevents any chafing of the inner tube, as the movement is lost between the double reinforcing-strips D. This is also true in regard to the lower reinforcing-strip B, which is permitted a slight movement in that the strip is secured only in the center.

Now, having thus described my said invention, what I claim as new, and desire to secure by United States Letters Patent, is—

1. A tire divided longitudinally and having its edges connected by the lacing-cord H, and provided with the tread C, and the internal strip B that is secured in place only by the stitching 2 at its center, combined with the double strip D, and the uniting-strip 5, substantially as shown.

2. A tire having its edges recurved and stitched together by the threads $b$, and one of said edges turned back, and secured by the stitching 3, combined with the U-shaped or double strip D, and the strip 5; the remaining edge of the tire being connected by
5 the strip 5 to the strip D, which strip D forms a double thickness of material across the seam, substantially as set forth.

In testimony whereof I affix my signature in presence of two witnesses.

HENRY R. WYKERT.

Witnesses:
G. W. SUES,
A. M. ELKJER.